(12) United States Patent
Ogawa et al.

(10) Patent No.: US 7,163,455 B2
(45) Date of Patent: Jan. 16, 2007

(54) OPERATING DEVICE FOR AIR CONDITIONER FOR VEHICLE

(75) Inventors: Satoshi Ogawa, Aichi (JP); Tomoyuki Shibata, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 10/948,455

(22) Filed: Sep. 24, 2004

(65) Prior Publication Data
US 2005/0064808 A1   Mar. 24, 2005

(30) Foreign Application Priority Data
Sep. 24, 2003   (JP) .......................... P.2003-332059

(51) Int. Cl.
*B24D 13/02*   (2006.01)
(52) U.S. Cl. .................. 454/69; 74/553; 267/163
(58) Field of Classification Search ................. 454/69; 74/553; 267/158, 163
See application file for complete search history.

(56) References Cited

U.S. PATENT DOCUMENTS 4,597,331 A * 7/1986 Hamisch, Jr. ............... 101/110
5,232,140 A * 8/1993 Gregory et al. ............ 226/74
5,537,893 A * 7/1996 Snider ....................... 74/553

FOREIGN PATENT DOCUMENTS

| EP | 1 536 303 A2 | 6/1995 |
| EP | 0 771 681 A2 | 5/1997 |
| JP | 08152932 A * | 6/1996 |
| JP | 2000105619 A * | 4/2000 |

* cited by examiner

*Primary Examiner*—Gregory Wilson
(74) *Attorney, Agent, or Firm*—Morgan, Lewis & Bockius LLP (57) ABSTRACT

A plurality of click portions is formed integrally with a unit body. The click portions are arranged on a common circular track, and a dial is engaged with the click portions so as to be unstable and to be prevented from slipping off. Therefore, it is not necessary to provide a D spring for coupling the dial to a shaft so as to be unstable and to be prevented from slipping off. Consequently, it is possible to reduce the number of components and a cost.

18 Claims, 9 Drawing Sheets

OPERATING DEVICE FOR AIR CONDITIONER FOR VEHICLE

BACKGROUND OF THE INVENTION

The present invention relates to an operating device for operating a vehicle air conditioner in a vehicle.

Some operating devices have such a structure that the state of an air conditioner is switched based on the rotating operation of a dial.

Figure 9:
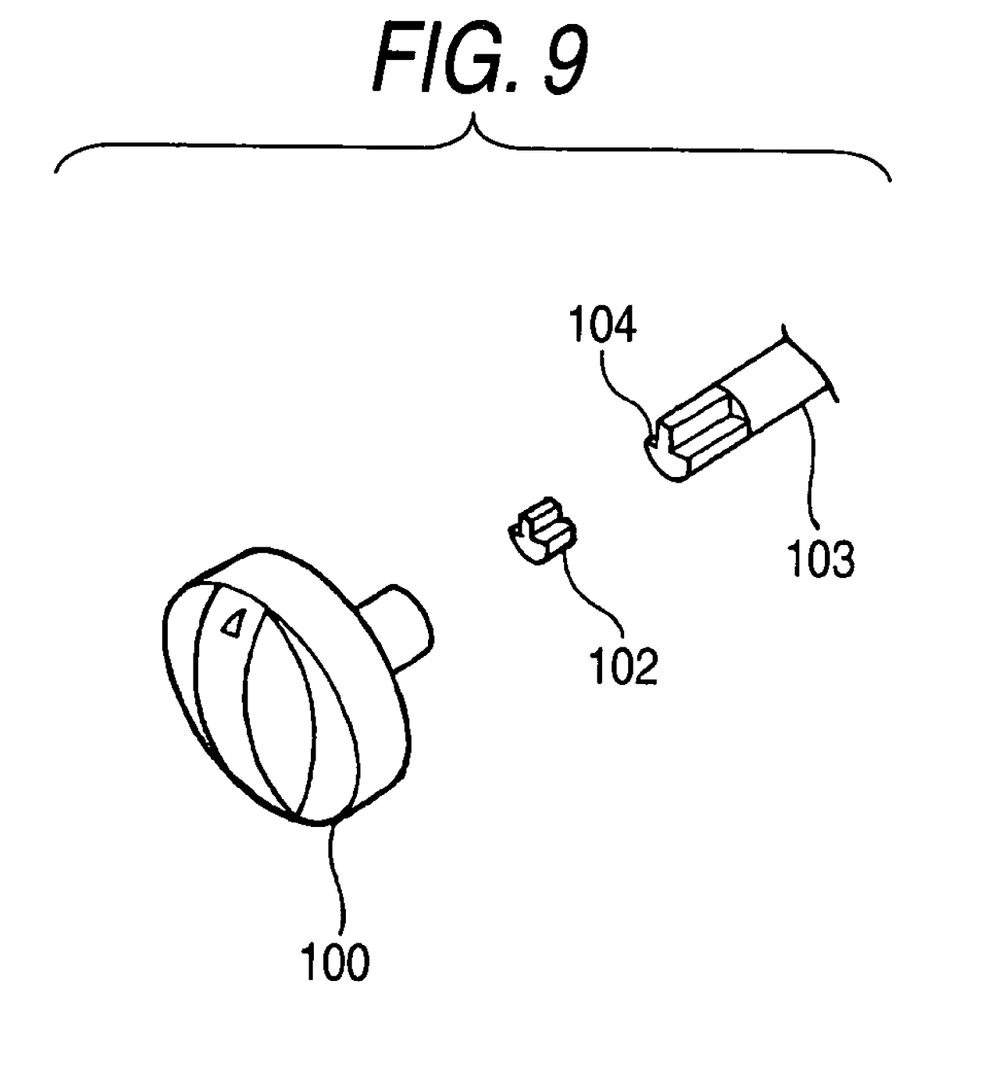
FIG. 9 is a view showing a conventional example.

With this structure, as shown in FIG. 9, a boss 101 is provided on a dial 100, and the dial 100 is coupled to a shaft 103 so as to be unstable and to be prevented from slipping off based on the fitting of a D cut portion 104 of the shaft 103 in the inner peripheral surface of the boss 101 through a D spring 102. For this reason, the number of components is increased so that a cost tends to be increased.

The invention has been made in consideration of the circumstances and has an object to provide an operating device of an air conditioner for a vehicle which can reduce the number of components and a cost.

A first aspect of the invention is directed to an operating device of an air conditioner for a vehicle, comprising a plurality of click portions positioned on an identical circular track to a base and formed integrally, and a dial engaged rotatably with the click portions and serving to operate the air conditioner for a vehicle.

According to the first aspect of the invention, the dial is held in the base so as to be rotatable and to be prevented from slipping off based on the engagement of the dial with the click portions. Therefore, the D spring for coupling the dial to the shaft so as to be unstable and to be prevented from slipping off is not required. Consequently, it is possible to reduce the number of components and a cost.

BRIEF DESCRIPTION OF THE DRAWINGS

FIGS. 5A and 5B are views showing the mode selecting unit, the blower unit and the temperature control unit in an assembling state (FIG. 5A is a top view and FIG. 5B is a front view)

DETAILED DESCRIPTION OF PREFERRED EMBODIMENTS

Figure 3:
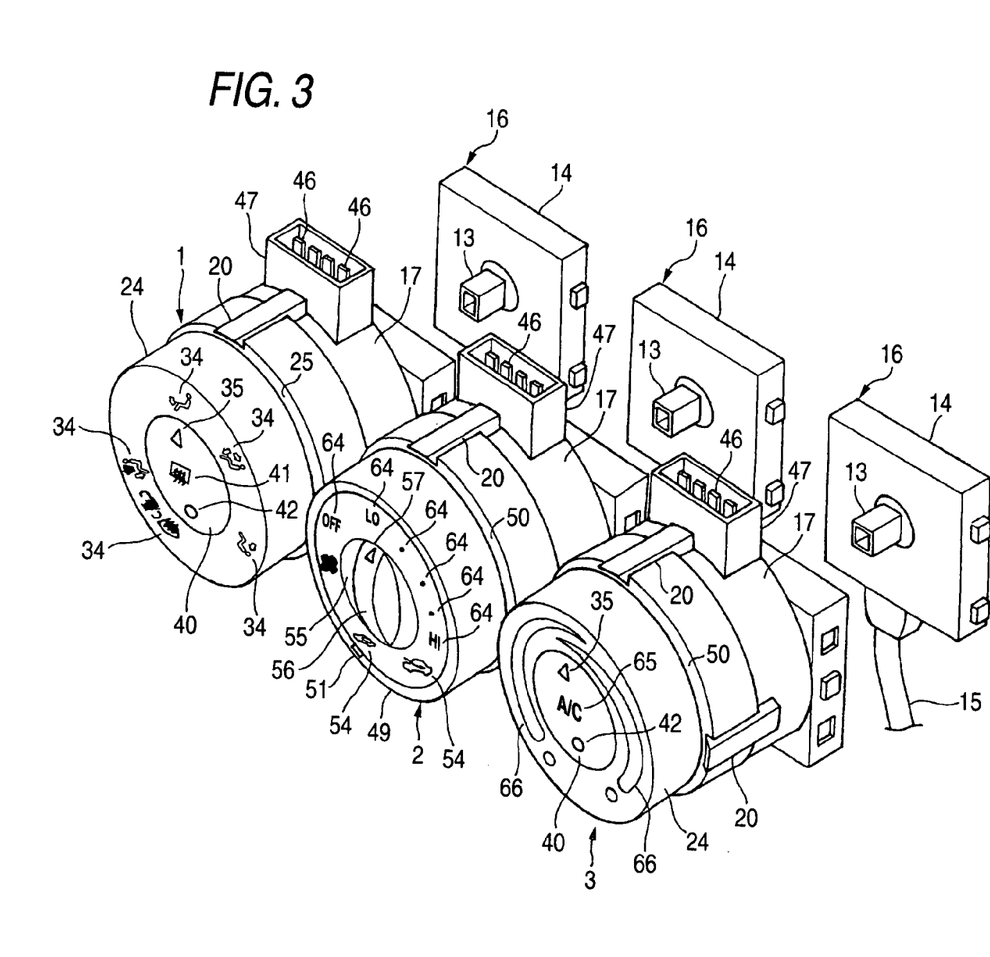
FIG. 3 is a view corresponding to FIG. 1, illustrating a blower unit.
Figure 4:
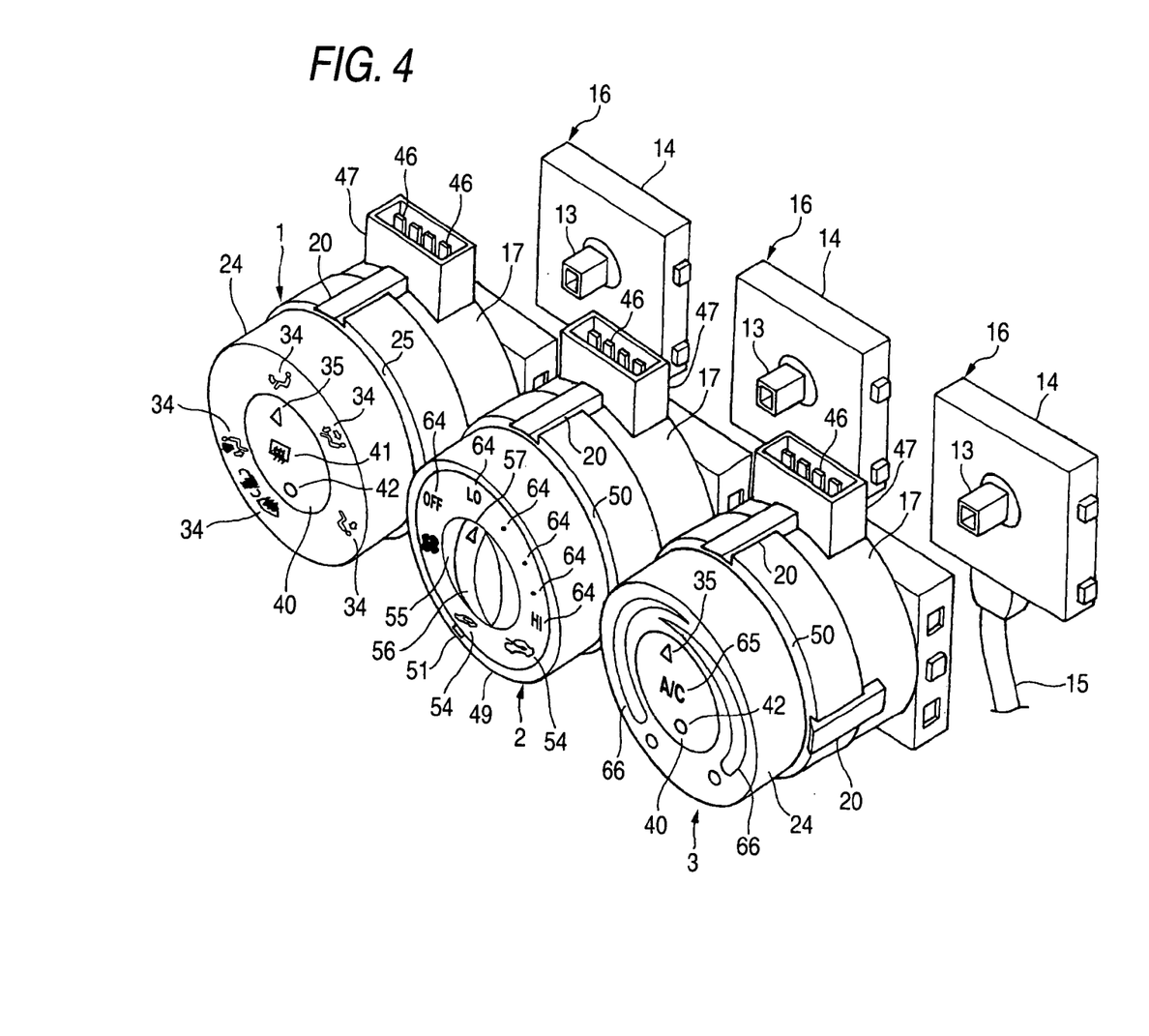
FIG. 4 is a perspective view showing the mode selecting unit, the blower unit, and a temperature control unit.
Figure 5A:
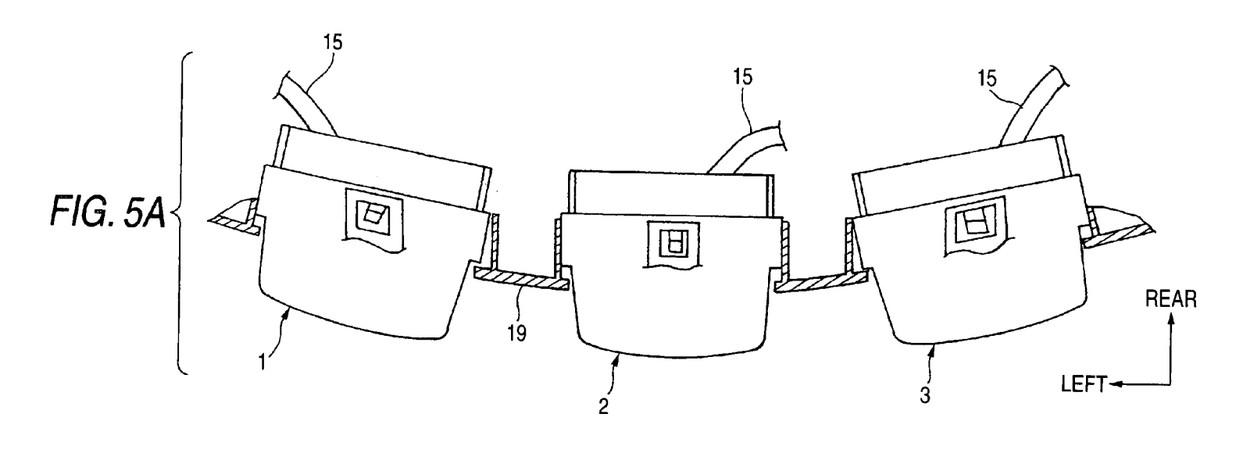
Figure 5B:
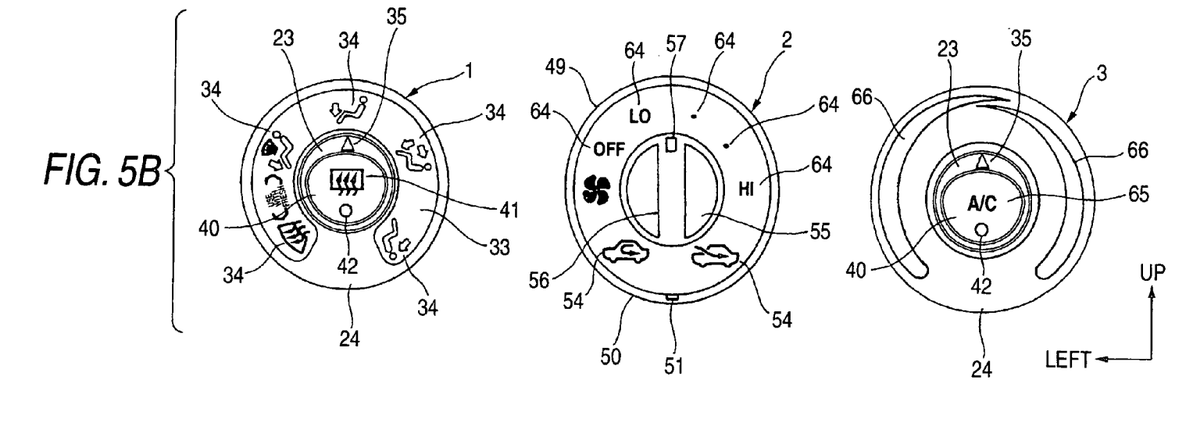

A first example of the invention will be described with reference to FIGS. 1A to 5B. As shown in FIGS. 5A and 5B, a mode selecting unit 1, a blower unit 2 and a temperature control unit 3 are attached into a vehicle. The mode selecting unit 1 to the temperature control unit 3 are separated mechanically, electrically and independently. The detailed structures of the mode selecting unit 1 to the temperature control unit 3 are as follows.

1. Mode Selecting Unit 1

Figure 1A:
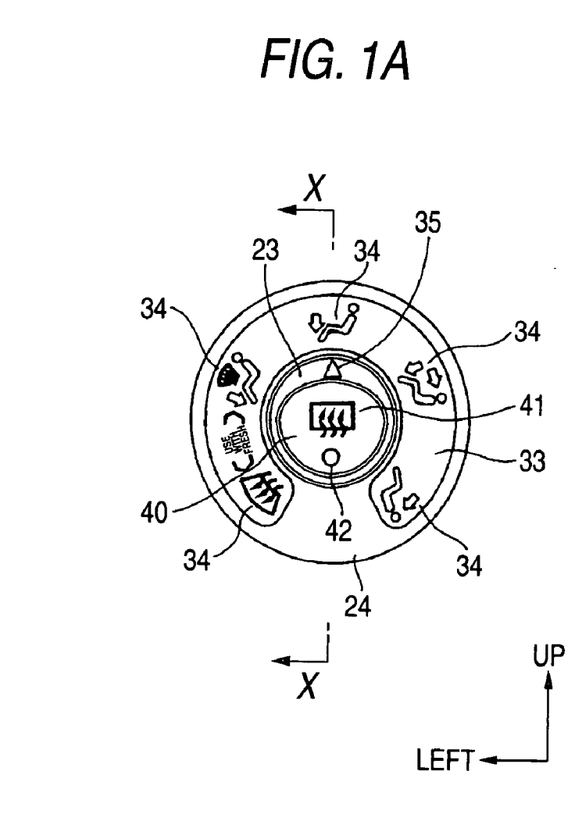
FIGS. 1A and 1B are views showing a first example of the invention (FIG. 1A is a front view showing a mode selecting unit and FIG. 1B is a sectional view taken along an X line)
Figure 1B:
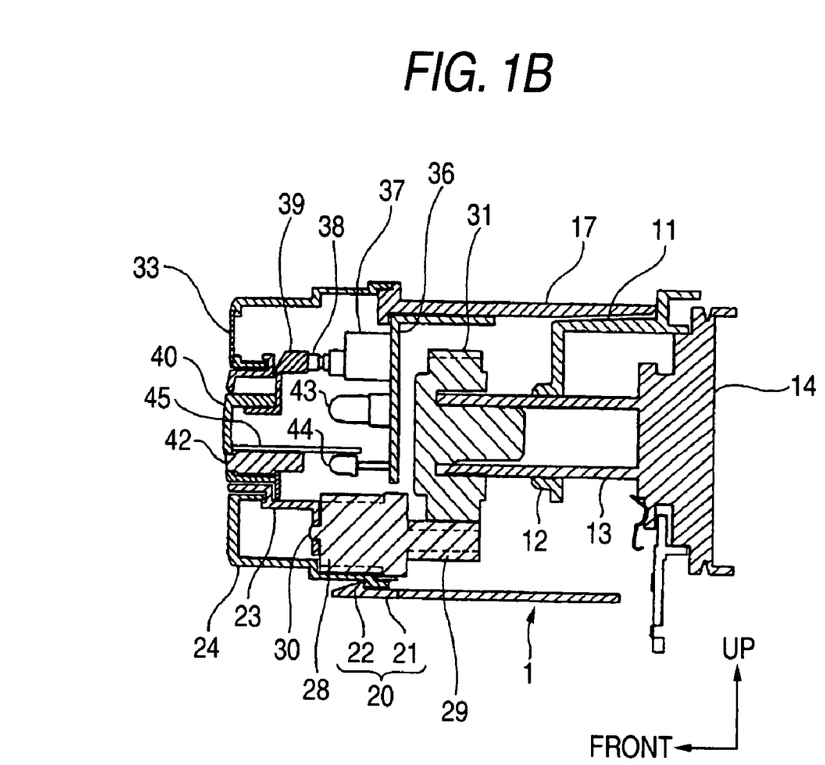

A unit base 11 formed of a synthetic resin is fixed to the instrument panel side of a vehicle as shown in FIG. 1B. A cylindrical bearing 12 is formed integrally with the unit base 11 and a cylindrical shaft 13 is rotatably fitted in the inner peripheral surface of the bearing 12. The shaft 13 is formed of a synthetic resin as a material, and a cable 15 is formed integrally with the shaft 13.

Figure 2:
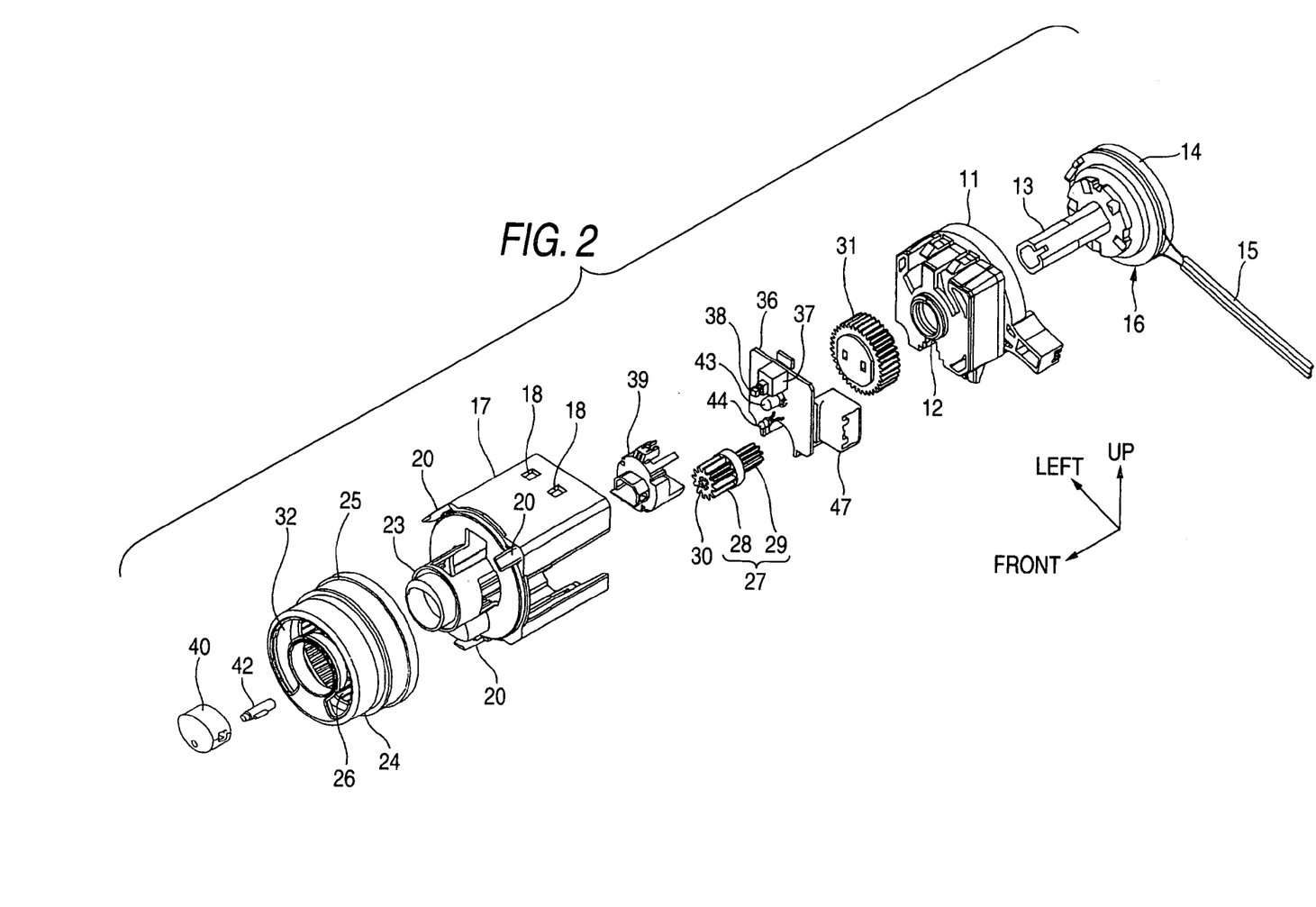
FIG. 2 is an exploded perspective view showing the mode selecting unit.

As shown in FIG. 2, the left end of a cable 15 is attached to the cable base 14, and the right end of the cable 15 is mechanically connected to an air conditioner (not shown). The shaft 13, the cable base 14 and the cable 15 constitute a cable unit 16, and the right end of the cable 15 is moved based on the rotation of the cable base 14 around the shaft 13.

As shown in FIG. 1B, a unit body 17 formed of an opaque synthetic resin is fixed to the unit base 11. A plurality of attachment holes 18 is formed on the unit body 17 as shown in FIG. 2, and the unit body 17 is fixed to a cluster panel 19 (see FIGS. 5A and 5B) based on the engagement of the attachment holes 18 with click portions (not shown) of the cluster panel 19. Incidentally, the unit body 17 corresponds to a base.

As shown in FIG. 2, a plurality of snap fit portions 20 is formed integrally with the outer peripheral portion of the unit body 17. The snap fit portions 20 are arranged at equal pitches in a circumferential direction over a common circular track, and is constituted by a leg portion 21 extended in a longitudinal direction and a protruded click portion 22 positioned in the tip part of the leg portion 21 as shown in FIG. 1B.

As shown in FIG. 2, a plurality of snap fit portions 20 is formed integrally with the outer peripheral portion of the unit body 17. The snap fit portions 20 are arranged at equal pitches in a circumferential direction over a common circular track, and are constituted by a leg portion 21 extended in a longitudinal direction and a protruded click portion 22 positioned in the tip part of the leg portion 21 as shown in FIG. 1B.

As shown in FIG. 2, a cylindrical dial base 23 formed of a colored opaque synthetic resin is formed integrally with the front end of the unit body 17. A dial 24 formed of a synthetic resin is inserted in the outer peripheral portion of the dial base 23 as shown in FIG. 1B, and a ring-shaped seat portion 25 having a large diameter is formed integrally with the rear end of the dial 24 as shown in FIG. 2. A plurality of click portions 22 are engaged with the seat portion 25 as shown in FIG. 1B and the dial 24 is prevented from slipping from the unit body 17 by an engaging force between the click portions 22 and the seat portion 25. More specifically, the dial 24 is rotated with respect to the unit body 17 based on the guide of inner and outer peripheral surfaces by the dial base 23 and the snap fit portions 20.

A gear portion 26 is formed integrally with the inner peripheral surface of the dial 24 as shown in FIG. 2, and a large diameter portion 28 of a main driving gear 27 is mated with the gear portion 26 as shown in FIG. 1B. The main driving gear 27 is formed of a synthetic resin as a material, and has the toothed large diameter portion 28 and a toothed small diameter portion 29 integrally. The main driving gear 27 is attached to the unit body 17 rotatably around a shaft 30, and the main driving gear 27 is rotated relatively to the dial 24 in the operation of the dial 24. The large diameter portion 28 and the small diameter portion 29 correspond to a first gear portion and a second gear portion, respectively.

A driven gear 31 formed of a synthetic resin is mated with the small diameter portion 29 of the main driving gear 27. The driven gear 31 is fixed unrotatably to the shaft 13 and the cable 15 is moved and operated based on the rotating operation of the driven gear 31 through the main driving gear 27 in the operation of the dial 24. In other words, the main driving gear 27 functions as a transmitting member for transmitting the operating force of the dial 24 to the driven gear 31 and a regulating member for regulating the amount of the rotation of the driven gear 31 with respect to the amount of the operation of the dial 24. More specifically, the amount of the operation of the dial 24 and the amount of the rotation of the driven gear 31 are set to be "1:1".

As shown in FIG. 2, an arcuate opening portion 32 is formed on the dial 24. A mark plate 33 formed of a colored opaque synthetic resin is fixed into the opening portion 32 as shown in FIG. 1B, and a plurality of transparent mode marks 34 is fixed to the mark plate 33 as shown in FIG. 1A.

A transparent pointer 35 formed of a synthetic resin is fixed to the dial base 23. The pointer 35 serves to display a wind blow-off position in cooperation with the mode mark 34. More specifically, when the mode marks 34 are selectively opposed to the outer peripheral portion of the pointer 35 based on the rotating operation of the dial 24, the cable 15 is moved corresponding to the rotating position of the dial 24 so that the air conditioner selectively opens a blow-off port corresponding to the result of the selection of the mode mark 34.

As shown in FIG. 1B, a switchboard 36 formed of a synthetic resin is fixed into the unit body 17, and a switch 37 is mechanically fixed to the switch board 36. The switch 37 is formed by a lock type push-push switch which is self-held in an ON state in which a plunger 38 is pushed in rearward, and a knob holder 39 formed of a synthetic resin is mechanically coupled to the plunger 38.

A knob 40 is fixed to the knob holder 39, and a rear defogger mark 41 formed of a synthetic resin is fixed to the knob 40 as shown in FIG. 1A. The knob and the rear defogger mark 41 are constituted by forming a colored opaque synthetic resin and a colored transparent synthetic resin in two colors. The knob 40 is accommodated unrotatably in the dial base 23 as shown in FIG. 1B and is provided in the central part of the dial 24 as shown in FIG. 1A.

The knob 40 is slidable in a longitudinal direction relatively to the dial 24. When the knob 40 is operated rearward from a forward OFF position, the plunger 38 of the switch 37 is ON-operated through the knob holder 39 and is thus held in an ON position in which the knob 40 is pressed into the dial base 23 by the self holding force of the switch 37. When the knob 40 is pushed in rearward in this state, it slides forward by the restoring force of the plunger 38 based on the operation of the release of the switch 37 and returns to the forward OFF position.

As shown in FIG. 1B, the front end of a lens 42 is inserted in the knob 40. The lens 42 is formed of a colored transparent synthetic resin as a material and is fixed to the knob 40. Moreover, a white lamp 43 and a red LED 44 are mechanically fixed to the switch board 36. The lamp 43 and the LED 44 are provided behind the rear defogger mark 41 and the lens 42, and the rear defogger mark 41 and the lens 42 are illuminated when the lamp 43 and the LED 44 emit lights. Furthermore, a plurality of lamps (not shown) is positioned behind a plurality of mode marks 34 and is fixed to the switch board 36, and the mode marks 34 are illuminated based on the ON operation of the lamps provided therebehind.

A shielding plate 45 is positioned between the rear defogger mark 41 and the lens 42 and is formed integrally with the knob 40. The shielding plate 45 has a rear end overlapping with the LED 44 in a vertical direction, suppresses the mixture of a light projected from the lamp 43 and a light projected from the LED 44 and converges the light projected from the lamp 43 and the light projected from the LED 44 on the rear defogger mark 41 and the lens 42.

A plurality of conductive plates 46 (see FIG. 4) is mechanically fixed to the switch board 36, and the switch 37, the lamp 43 for rear defogger illumination, the LED 44 for an indicator and the lamps for mode illumination are electrically connected to the conductive plates 46. Moreover, a connector housing 47 is formed integrally with the switchboard 36 as shown in FIG. 2. One of the ends of each of the conductive plates 46 is accommodated in the connector housing 47, and the switch 37, the lamp 43 for rear defogger illumination, the LED 44 for an indicator and the lamps for mode illumination are electrically connected to the air conditioner based on the fitting of a harness connector (not shown) in the connector housing 47.

The air conditioner has a rear defogger function of carrying out defogging based on the heating of a rear glass. When the knob 40 is ON operated, the switch 37 is turned ON so that the air conditioner operates the rear defogger function based on the detection of the ON state of the switch 37. Then, the lens 42 is caused to emit a light based on the application of a driving power source to the LED 44 and a driver is informed of the ON operation of the rear defogger function.

2. Blower Unit 2

The blower unit 2 shares a large number of components together with the mode selecting unit 1, and different portions from the mode selecting unit 1 are as follows.

As shown in FIG. 3B, a dial base 48 formed of a synthetic resin is fixed to the unit body 17 and an outer dial 49 formed of a synthetic resin is fitted in the outer peripheral surface of the dial base 48. The outer dial 49 is caused to be rotatable and is prevented from slipping off based on the engagement of a seat portion 50 having a large diameter with the click portions 22 of the unit body 17 as shown in FIG. 4, and a pointer 51 is fixed to the outer dial 49 as shown in FIG. 3B. The gear portion 26 is formed integrally with the inner peripheral surface of the outer dial 49 and is mated with the large diameter portion 28 of the main driving gear 27.

As shown in FIG. 3B, an arcuate opening portion 52 is formed on the dial base 48, and as shown in FIG. 3A, a colored opaque mark plate 53 formed of a synthetic resin is fixed into the opening portion 52 as shown in FIG. 3A. Two transparent intake marks 54 are fixed to the mark plate 53. When the pointer 51 is selectively opposed to the outer peripheral portion of the intake mark 54 based on the rotating operation of the outer dial 49, the cable 15 is moved corresponding to the position of the rotating operation of the outer dial 49. Consequently, the air conditioner detects the position of the movement of the cable 15 and selectively opens an intake for inside air which serves to take in the inside air or an intake for outside air which serves to take in the outside air depending on the result of the selection of the intake mark 54.

As shown in FIG. 3B, an inner dial 55 formed of a synthetic resin is rotatably attached to the inner peripheral surface of the dial base 48 and a protruded dial operating portion 56 is formed integrally with the front surface of the inner dial 55. The front end of a lens 57 to function as a pointer is fixed to the dial operating portion 56 as shown in FIG. 3B and the lens 57 is illuminated based on the ON operation of the lamp 44 of the switch board 36.

A shaft 59 of a contact holder 58 is fixed to the inner dial 55. A movable contact 61 is coupled to the contact holder 58 through a contact spring 60. By the spring force of the contact spring 60, the movable contact 61 is pushed against a fixing contact 62. The fixing contact 62 constitutes a blower switch 63 together with the movable contact 61 and is fixed to the switch board 36. The blower switch 63 is electrically connected to the air conditioner based on the fitting of the harness connecter to the connector housing 47, and the air conditioner sets the amount of the blow-off of the wind based on a signal output from the blower switch 63.

As shown in FIG. 3A, a plurality of transparent blower marks 64 are fixed to the mark plate 53. The blower marks 64 and the intake marks 54 are illuminated based on the ON operation of the lamps of the switch board 36. When the lens 57 is selectively opposed to the inner peripheral portion of the blower mark 64 based on the rotating operation of the inner dial 55, a signal corresponding to the position of the rotation of the inner dial 55 is output from the blower switch 63. Consequently, the air conditioner sets the amount of the blow-off of the wind based on the signal output from the blower switch 63, thereby regulating the amount of the blow-off of the wind to have a value corresponding to the result of the selection of the blower mark 64.

3. Temperature Control Unit 3

The temperature control unit 3 shares a large number of components together with the mode selecting unit 1, and different portions from the mode selecting unit 1 are as follows.

An air conditioning mark 65 is positioned in the forward part of the lamp 43 and is fixed to the knob 40 as shown in FIG. 4. In the OFF state of the knob 40, the air conditioner detects the OFF state of the switch 37 to selectively cause a heater function to be valid. In this state, the LED 44 is turned OFF so that the driver is informed of the OFF state of an air conditioning function. In the ON state of the knob 40, moreover, the air conditioner detects the ON state of the switch 37 to selectively cause the air conditioning function to be valid. In the ON state, the lens 42 emits a light based on the ON operation of the LED 44 so that the driver is informed of the ON state of the air conditioning function.

Two temperature marks 66 are fixed to the dial 24. When the predetermined position of the temperature mark 66 is opposed to the outer peripheral portion of the pointer 35 based on the rotating operation of the dial 24, the cable 15 is moved corresponding to the position of the rotation of the dial 24 and the air conditioner sets the blow-off temperature of the wind corresponding to the position of the movement of the cable 15.

According to the first example, the click portions 22 are formed integrally with the unit body 17, and the dial 24 or the outer dial 49 is held in the unit body 17 so as to be unstable and to be prevented from slipping off based on the engagement of the dial 24 or the outer dial 49 with the click portions 22. For this reason, it is not necessary to provide the D spring for coupling the dial 24 and the outer dial 49 to the shaft so as to be unstable and to be prevented from slipping off. Consequently, it is possible to reduce the number of components and a cost.

Moreover, the dial 24 and the rear defogger mark 41 are constituted by forming a colored opaque synthetic resin and a colored transparent synthetic resin in two colors. For this reason, the rear defogger mark 41 is seen to be black when the lamp 43 is OFF and is seen to be colored and shiny when the lamp 43 is ON. In particular, therefore, the visual recognizing property of the rear defogger mark 41 can be enhanced in the ON state of the lamp 43. This advantage is also the same as that for the air conditioning mark 65.

Figure 6:
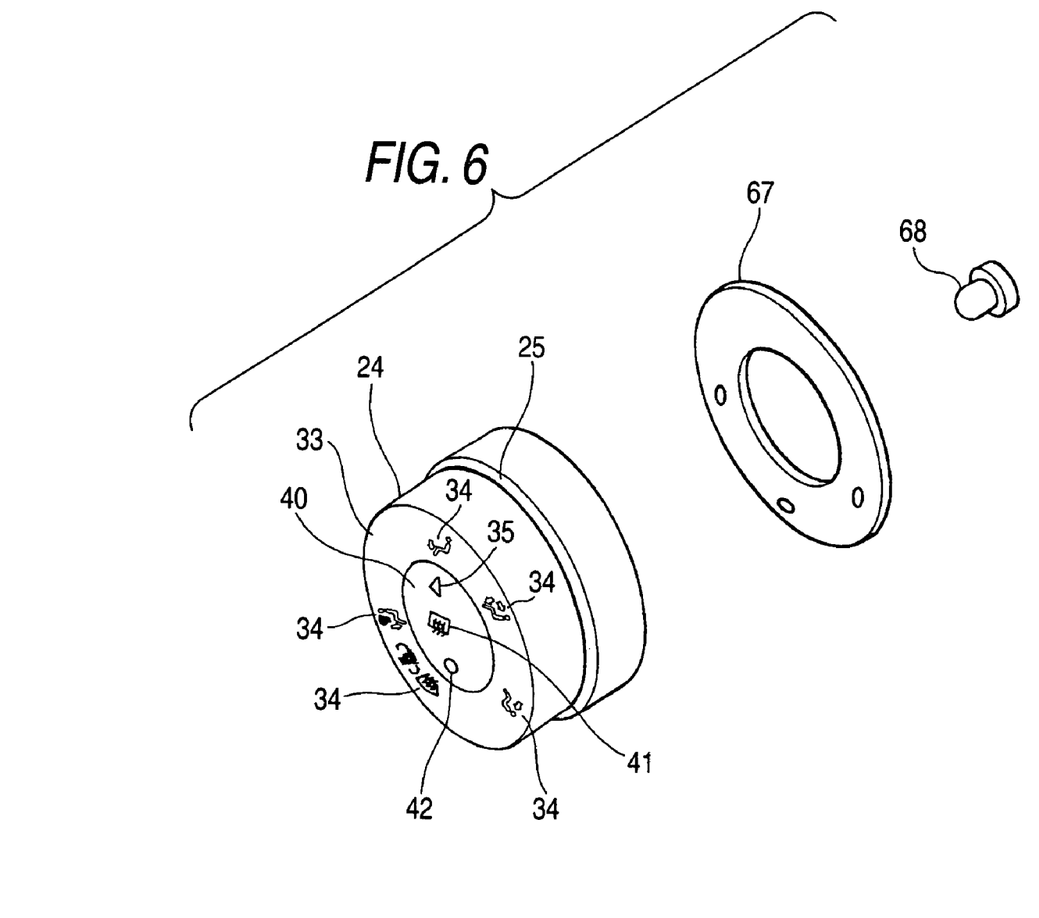
FIG. 6 is a view showing a second example of the invention (a perspective view illustrating a dial, a diffusing plate and a lamp)

Next, a second example of the invention will be described with reference to FIG. 6. A milk-white diffusing plate 67 is accommodated in a dial 24 of a mode selecting unit 1. The diffusing plate 67 is ring-shaped corresponding to a mark plate 33 and carries out a plane emission based on the ON operation of a lamp 68 of a switch board 36 so that a plurality of mode marks 34 of the mark plate 33 is illuminated at a time. With this structure, the mode marks 34 can be illuminated uniformly by a small number of lamps 68. Consequently, the number of components can also be reduced.

While the mode marks 34 of the mode selecting unit 1 are illuminated by the diffusing plate 67 in the second example, this is not restricted but a plurality of intake marks 54 and a plurality of blower marks 64 in a blower unit 2 may be illuminated by the diffusing plate 67.

Figure 7A:
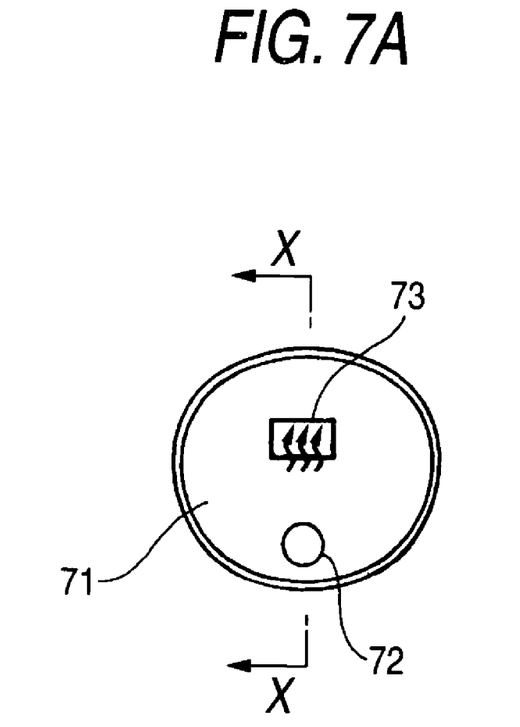
FIGS. 7A and 7B are views showing a third example of the invention (FIG. 7A is a front view showing a knob and FIG. 7B a sectional view taken along an X line)
Figure 7B:
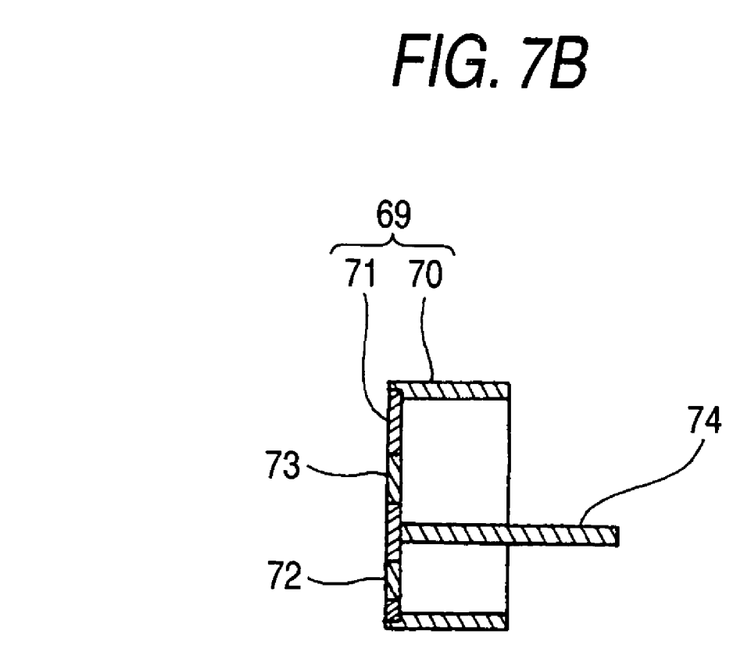

Next, a third example of the invention will be described with reference to FIG. 7. A dial 69 is attached to a mode selecting unit 1 in place of a dial 40. The dial 69 is constituted based on the fixation of a disk-shaped mark plate 71 to a cylindrical body portion 70, and the mark plate 71 is provided with an indicator 72 and a rear defogger mark 73 and a shielding plate 74 is positioned between the indicator 72 and the rear defogger mark 73 and is formed integrally with the body portion 70. The indicator 72 and the rear defogger mark 73 are formed based on the execution of printing over the mark plate 71, and are illuminated based on the ON operation of an LED 44 and a lamp 43 which are provided therebehind. With this structure, it is not necessary to form a knob 40 and a rear defogger mark 41 in two colors, and furthermore, to eliminate a lens 57. Consequently, a cost can be reduced.

Figure 8A:
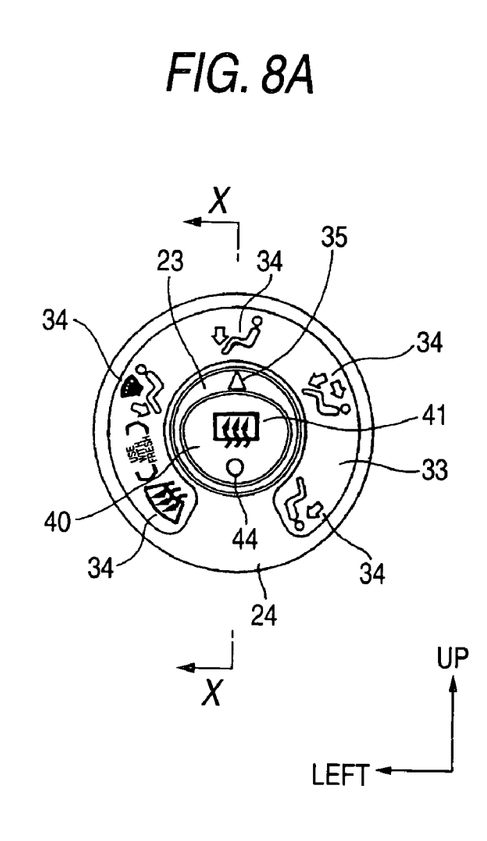
FIGS. 8A and 8B are views corresponding to FIGS. 1A and 1B, illustrating a fourth example of the invention.
Figure 8B:
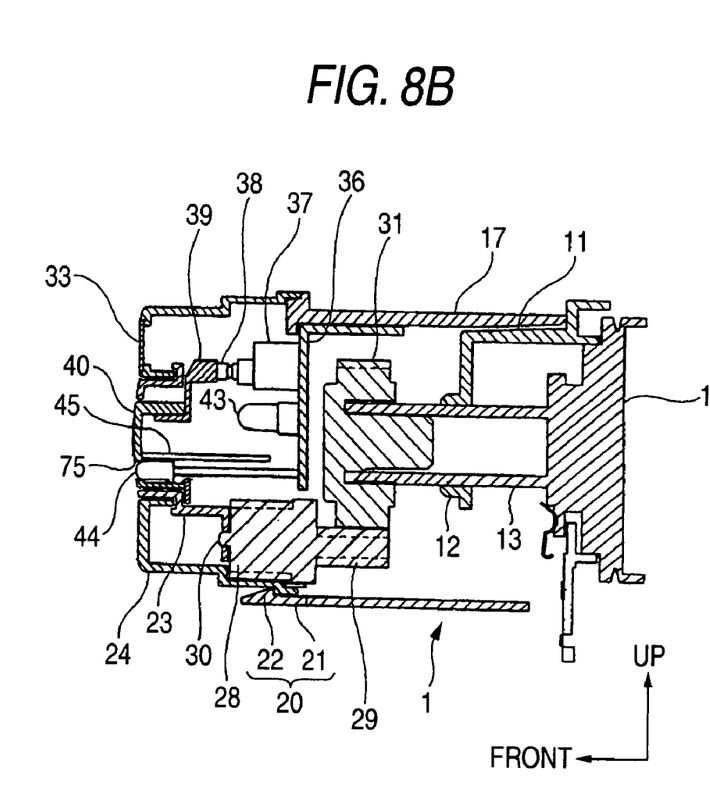

Next, a fourth example of the invention will be described with reference to FIG. 8. A through hole 75 is formed on a knob 40 of a mode selecting unit 1. An LED 44 of a switch board 36 is inserted in the through hole 75, and a driver confirms the operating condition of a rear defogger function based on the direct recognition of the light emitting state of the LED 44. With this structure, a lens 57 is not required. Consequently, it is possible to reduce the number of components and a cost.

What is claimed is:

1. A device for controlling operation of a vehicle air conditioner comprising:
 a first member having a first longitudinal axis having
  an upper surface,
  a lower surface,
  a side wall extending from the upper surface to the lower surface, the side wall including
   a first surface proximate the lower surface defining a first outer dimension of the first member; and
   a second surface located between the first surface and the upper surface defining a second outer dimension of the first member, the first outer dimension being greater than the second outer dimension, and
  at least one third surface defining a first passage from the lower surface to an interior of the first member,
 a second member having a second longitudinal axis including a cylindrical body having a fourth surface defining an outer dimension of the cylindrical body, and an enclosure defining a first chamber spaced from the cylindrical body along the second longitudinal axis, the enclosure including a plurality of projections proximate the first chamber spaced radially from the cylindrical body, the plurality of projections being disposed on the first surface of the first member, such that the plurality of projections connect the second member to the first member, a gear disposed in the second member and engaged with the first member, and a control mechanism engaged with the gear such that rotation of the gear controls a first operation of the vehicle air conditioner.

2. The device of claim 1, wherein the fourth surface of the cylindrical body and the at least one third surface of the first member comprise a joint such that the first member oscillates about the cylindrical body.

3. The device of claim 2, wherein the at least one third surface comprises a plurality of elements that mesh with the gear such that the plurality of elements transmit motion from the first member to the gear as the first member oscillates about the cylindrical body.

4. The device of claim 3, wherein the gear comprises a first geared portion engaged with the first member and a second geared portion engaged with the control mechanism.

5. The device of claim 4, wherein the second geared portion is entirely disposed within the first chamber.

6. The device of claim 1, further comprising a fourth member proximate the second member and disposed about a portion of the control mechanism such that the fourth member supports the control mechanism in engagement with the gear.

7. The device of claim 6, wherein a portion of the fourth member is received within the second member.

8. The device of claim 6, wherein the second member includes at least one fastening element attachment site and the fourth member includes at least one fastening element such that the at least one fastening element attachment site and the at least one fastening element cooperate to secure the fourth member to the second member.

9. The device of claim 1, wherein the first member includes at least one fifth interior surface defining a second passage from the upper surface to the first passage.

10. The device of claim 9, wherein the cylindrical body has a proximal end adjacent the first member and a distal end adjacent the first chamber, the proximal end of the cylindrical body being received within the second passage.

11. The device of claim 10, further comprising a control knob disposed in the proximal end of the cylindrical body, the control knob being operable between a first position and a second position, the second position being spaced from the first position along the second longitudinal axis such that in the second position the control knob contacts the control mechanism to activate a second operation of the vehicle air conditioner.

12. The device of claim 11, wherein in the first position the control knob contacts the control mechanism to deactivate the second operation of the vehicle air conditioner.

13. The device of claim 11, wherein the control mechanism activates the second operation of the vehicle air conditioner by an electrical signal.

14. A device for controlling operation of a vehicle air conditioner comprising:

a first member having a first longitudinal axis having
an upper surface,
a lower surface,
a side wall extending from the upper surface to the lower surface, the side wall including
a first surface proximate the lower surface defining a first outer dimension of the first member; and
a second surface located between the first surface and the upper surface defining a second outer dimension of the first member, the first outer dimension being greater than the second outer dimension, and
at least one third surface defining a first passage from the lower surface to an interior of the first member, a second member having a second longitudinal axis including
a cylindrical body having a fourth surface defining an outer dimension of the cylindrical body, and
an enclosure defining a first chamber spaced from the cylindrical body along the second longitudinal axis, the enclosure including a plurality of projections proximate the first chamber spaced radially from the cylindrical body, the plurality of projections being disposed on the first surface of the first member, such that the plurality of projections connect the second member to the first member; and a control mechanism operatively associated with the first member such that rotation of the first member controls a first operation of the vehicle air conditioner.

15. The device of claim 14, wherein the control mechanism comprises a gear engaged with the first member.

16. The device of claim 14, wherein the first operation comprises opening a wind blow-off port.

17. The device of claim 14, wherein the first operation comprises opening an air intake port.

18. The device of claim 14, wherein the first operation comprises setting an amount of wind blow-off.

* * * * *